(12) United States Patent
Jain (10) Patent No.: US 8,997,107 B2
(45) Date of Patent: Mar. 31, 2015

(54) ELASTIC SCALING FOR CLOUD-HOSTED BATCH APPLICATIONS

(75) Inventor: Navendu Jain, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 111 days.

(21) Appl. No.: 13/171,425

(22) Filed: Jun. 28, 2011

(65) Prior Publication Data
US 2013/0007753 A1    Jan. 3, 2013

(51) Int. Cl.
G06F 9/46 (2006.01)
G06F 15/173 (2006.01)
G06F 9/48 (2006.01)

(52) U.S. Cl.
CPC ............... *G06F 9/46* (2013.01); *G06F 9/4881* (2013.01); *G06F 2209/483* (2013.01)
USPC ........... 718/104; 718/105; 709/223; 709/224; 709/225; 709/226

(58) Field of Classification Search
None
See application file for complete search history.

(56) References Cited

U.S. PATENT DOCUMENTS

| | | | |
|---|---|---|---|
| 7,644,153 B2* | 1/2010 | Talwar et al. | 709/224 |
| 7,702,779 B1* | 4/2010 | Gupta et al. | 709/224 |
| 7,930,700 B1* | 4/2011 | Basu et al. | 718/102 |
| 8,234,377 B2* | 7/2012 | Cohn | 709/225 |
| 8,266,290 B2* | 9/2012 | Calder et al. | 709/226 |
| 8,296,434 B1* | 10/2012 | Miller et al. | 709/226 |
| 8,312,460 B1* | 11/2012 | Blanding | 718/104 |
| 2003/0065703 A1* | 4/2003 | Aborn | 709/105 |
| 2003/0149755 A1* | 8/2003 | Sadot | 709/223 |
| 2004/0194055 A1* | 9/2004 | Galloway et al. | 717/101 |
| 2005/0027863 A1* | 2/2005 | Talwar et al. | 709/226 |
| 2005/0102398 A1* | 5/2005 | Zhang et al. | 709/225 |
| 2006/0218285 A1* | 9/2006 | Talwar et al. | 709/227 |
| 2007/0143761 A1* | 6/2007 | Deng | 718/103 |
| 2009/0049177 A1* | 2/2009 | Iszlai et al. | 709/226 |
| 2009/0055461 A1* | 2/2009 | Georgis et al. | 709/201 |
| 2010/0100877 A1* | 4/2010 | Greene et al. | 718/1 |
| 2010/0125473 A1 | 5/2010 | Tung et al. | |
| 2010/0131592 A1* | 5/2010 | Zhang et al. | 709/203 |

(Continued)

OTHER PUBLICATIONS

Singh et al. "Application-level Resource Provisioning on the Grid". 2nd IEEE International Conference on E-Science and Grid Computing, 2006.*

(Continued)

*Primary Examiner* — Adam Lee
(74) *Attorney, Agent, or Firm* — Judy Yee; Heikki Einola; Micky Minhas (57) ABSTRACT

An elastic scaling cloud-hosted batch application system and method that performs automated elastic scaling of the number of compute instances used to process batch applications in a cloud computing environment. The system and method use automated elastic scaling to minimize job completion time and monetary cost of resources. Embodiments of the system and method use a workload-driven approach to estimate a work volume to be performed. This is based on task arrivals and job execution times. Given the work volume estimate, an adaptive controller dynamically adapts the number of compute instances to minimize the cost and completion time. Embodiments of the system and method also mitigate startup delays by computing a work volume in the near future and gradually starting up additional compute instances before they are needed. Embodiments of the system and method also ensure fairness among batch applications and concurrently executing jobs.

20 Claims, 8 Drawing Sheets

(56) References Cited

U.S. PATENT DOCUMENTS

| | | | |
|---|---|---|---|
| 2010/0161549 A1* | 6/2010 | Plancarte et al. | 707/608 |
| 2010/0223385 A1* | 9/2010 | Gulley et al. | 709/226 |
| 2010/0232594 A1* | 9/2010 | Lawson et al. | 379/220.01 |
| 2010/0306377 A1 | 12/2010 | DeHaan et al. | |
| 2010/0318999 A1* | 12/2010 | Zhao et al. | 718/104 |
| 2010/0325283 A1* | 12/2010 | Luzzatti et al. | 709/226 |
| 2010/0325637 A1* | 12/2010 | Radmilac et al. | 718/104 |
| 2011/0004574 A1* | 1/2011 | Jeong et al. | 706/12 |
| 2011/0078303 A1* | 3/2011 | Li et al. | 709/224 |
| 2011/0138055 A1* | 6/2011 | Daly et al. | 709/226 |
| 2011/0145362 A1* | 6/2011 | Jones et al. | 709/217 |
| 2011/0246653 A1* | 10/2011 | Balasubramanian et al. | 709/226 |
| 2011/0247002 A1* | 10/2011 | Salapura et al. | 718/104 |
| 2011/0276686 A1* | 11/2011 | Tung et al. | 709/224 |
| 2011/0282982 A1* | 11/2011 | Jain | 709/223 |
| 2012/0022910 A1* | 1/2012 | Chi et al. | 705/7.22 |
| 2012/0057191 A1* | 3/2012 | Gnanasambandam et al. | 358/1.15 |
| 2012/0110462 A1* | 5/2012 | Eswaran et al. | 715/736 |
| 2012/0110582 A1* | 5/2012 | Ferdous et al. | 718/101 |
| 2012/0151061 A1* | 6/2012 | Bartfai-Walcott et al. | 709/226 |
| 2012/0173709 A1* | 7/2012 | Li et al. | 709/224 |
| 2012/0290726 A1* | 11/2012 | Brown et al. | 709/226 |
| 2012/0324092 A1* | 12/2012 | Brown et al. | 709/224 |

OTHER PUBLICATIONS

Liu et al. "A Compromised-Time-Cost Scheduling Algorithm in SwinDeW-C for Instance-Intensive Cost-Constrained Workflows on a Cloud Computing Platform". International Journal of High Performance Computing Applications, 2010.*
Armbrust, et al., "Above the Clouds: A Berkeley View of Cloud Computing", Technical Report No. UCB/EECS-2009-28, Feb. 10, 2009, pp. 25.
Hailey, Matt., "Cloud Computing: Applications, Limitations and Future Possibilities", Mar. 19, 2010, pp. 1-21.
Trushkowsky, et al., "The SCADS Director: Scaling a Distributed Storage System under Stringent Performance Requirements", USENIX Association, Feb. 2011, pp. 1-14.
Ashlagi, et al., "Competing Schedulers", Proceedings of the Twenty-Fourth AAAI Conference on Artificial Intelligence, Jul. 2010, pp. 691-696.
Martinaitis, et al., "Remote Interaction and Scheduling Aspects of Cloud Based Streams", 5th IEEE International Conference on E-Science Workshops, Dec. 9-11, 2009, pp. 39-47.
Liu, Henry H., "Performance and Scalability Prescriptions for Cloud Computing", Retrieved at, Retrieved Date: Mar. 28, 2011, pp. 12.
"Amazon CloudWatch", Retrieved at, Retrieved Date: Jul. 14, 2011, pp. 9.
"Amazon Elastic Block Store (EBS)", Retrieved at, Retrieved Date: Jul. 14, 2011, pp. 8.
"Amazon Elastic Compute Cloud (Amazon EC2)", Retrieved at, Retrieved Date: Jul. 14, 2011, pp. 25.
"Windows Azure", Retrieved at, Mar. 28, 2011, pp. 2.
Tao, Tao., "FTP Downloadable Blast Databases From NCBI", Retrieved at, Retrieved Date: Mar. 28, 2011, pp. 8.
"AzureWatch", Retrieved at, Retrieved Date: Mar. 28, 2011, pp. 2.
"Rackspace", Retrieved at, Retrieved Date: Mar. 28, 2011, pp. 1.
Abdelzaaher, et al., "Performance Guarantees for Web Server End-systems: A Control-theoretical Approach", IEEE Transactions on Parallel and Distributed Systems, vol. 13, No. 1, Jan. 2002, pp. 1-17.
Aron, et al., "Cluster Reserves: A Mechanism for Resource Management in Cluster-based Network Servers", ACM SIGMETRICS Performance Evaluation Review—Special issue on proceedings of ACM SIGMETRICS 2000, vol. 28, No. 1, Jun. 2000, pp. 12.
Chase, et al., "Managing Energy and Server Resources in Hosting Centers", ACM SIGOPS Operating Systems Review vol. 35, No. 5, Dec. 2001, pp. 14.
Dean, et al., "MapReduce: Simplified Data Processing on Large Clusters", Communications of the ACM—50th anniversary issue, vol. 51, No. 1, Jan. 2008, pp. 1-13.
Deelman, et al., "The Cost of Doing Science on the Cloud: The Montage Example", International Conference for High Performance Computing, Networking, Storage and Analysis, Nov. 15-21, 2008, pp. 12.
Edmonds, Jeff., "Scheduling in the Dark", Proceedings of the thirty-first annual ACM symposium on Theory of computing, May 1-4, 1999, pp. 1-30.
Edmonds, et al., "Non-Clairvoyant Multiprocessor Scheduling of Jobs with Changing Execution Characteristics (Extended Abstract)", Proceedings of the twenty-ninth annual ACM symposium on Theory of computing, May 4-6, 1997, pp. 10.
Gandhi, et al., "GAMPS: Compressing Multi Sensor Data by Grouping and Amplitude Scaling", Proceedings of the 35th SIGMOD international conference on Management of data, Jun. 29-Jul. 2, 2009, pp. 14.
He, et al., "Provably Efficient Online Non-clairvoyant Adaptive Scheduling", IEEE International Parallel and Distributed Processing Symposium, Mar. 26-30, 2007, pp. 10.
Hoffa, et al., "On the Use of Cloud Computing for Scientific Workflows", IEEE Fourth International Conference on eScience, Dec. 7-12, 2008, pp. 640-645.
Hsieh, et al., "The Architecture and Implementation of an Extensible Web Crawler", Proceedings of the 7th USENIX conference on Networked systems design and implementation, Jun. 2010, pp. 15.
Kohavi, et al., "Practical Guide to Controlled Experiments on the Web: Listen to Your Customers not to the Hippo", Proceedings of the 13th ACM SIGKDD international conference on Knowledge discovery and data mining, Aug. 12-15, 2007, pp. 9.
Lim, et al., "Automated Control for Elastic Storage", Proceeding of the 7th international conference on Autonomic computing, Jun. 7-11, 2010, pp. 1-10.
Lu, et al., "Azureblast: A Case Study of Developing Science Applications on the Cloud", Retrieved at, Proceedings of the 19th ACM International Symposium on High Performance Distributed Computing, Jun. 21-25, 2010, pp. 8.
Lu, et al., "Design, Implementation and Evaluation of Differentiated Caching Services", IEEE Transactions on Parallel and Distributed Systems, May 2004, vol. 15, No. 5, pp. 1-30.
Meng, et al., "Efficient Resource Provisioning in Compute Clouds via VM Multiplexing", Proceeding of the 7th international conference on Autonomic computing, Jun. 7-11, 2010, pp. 10.
Padala, et al., "Automated Control of Multiple Virtualized Resources", Proceedings of the 4th ACM European conference on Computer systems, Apr. 1-3, 2009, pp. 14.
Padala, et al., "Adaptive Control of Virtualized Resources in Utility Computing Environments", ACM SIGOPS Operating Systems Review—EuroSys'07 Conference Proceedings, vol. 41, No. 3, Jun. 2007, pp. 14.
Parekh, et al., "Using Control Theory to Achieve Service Level Objectives in Performance Management", Real-Time Systems, vol. 23, No. 1/2, Jul.-Sep. 2002, pp. 842-854.
Wang, et al., "A Distributed Control Framework for Performance Management of Virtualized Computing Environments: Some Preliminary Results", 6th International Conference on Autonomic Computing, Jun. 15-19, 2009, pp. 89-98.
Wang, et al., "Utilization and SLO-based Control for Dynamic Sizing of Resource Partitions", Proceedings of 16th IFIP/IEEE International Workshop on Distributed Systems: Operations and Management, Oct. 24-26, 2005, pp. 12.
Yu, et al., "Dryadlinq: A System for General-purpose Distributed Data-parallel Computing using a High-level Language", 8th USE IX Symposium on Operating Systems Design and Implemenuuion, 2008, pp. 1-14.
Zhu, et al., "What does Control Theory bring to Systems Research?", ACM SIGOPS Operating Systems Review, vol. 43, No. 1, Jan. 2009, pp. 8.
Zhuravlev, et al., "Addressing Shared Resource Contention in Multicore Processors via Scheduling", Proceedings of the fifteenth edition of ASPLOS on Architectural support for programming languages and operating systems, Mar. 13-17, 2010, pp. 13.

(56) References Cited

OTHER PUBLICATIONS

Gulati, et al., "PARDA: Proportional Allocation of Resources for Distributed Storage Access", IEEE International Conference on Robotics and Automation (ICRA), May 2010, pp. 85-98.

Kolter, et al., "A Probabilistic Approach to Mixed Open-loop and Closed-loop Control, with Application to Extreme Autonomous Driving", IEEE International Conference on Robotics and Automation Anchorage Convention District, May 3-8, 2010, pp. 839-845.

Lin, et al., "Time-sharing Parallel Applications with Performance Isolation and Control", Technical Report, NWU-EECS-06-10, Jan. 11, 2007, pp. 12.

Saez, et al., "A Comprehensive Scheduler for Asymmetric Multicore Systems", Fifth EuroSys Conference, Apr. 13-16, 2010, pp. 14.

Tsafrir, et al., "Modeling user Runtime Estimates", Job Scheduling Strategies for Parallel Processing, 11th International Workshop, JSSPP, Jun. 19, 2005, pp. 34.

Mu'Alem, et al., "Utilization, Predictability, Workloads, and User Runtime Estimates in Scheduling the IBM SP2 with Backfilling", vol. 12, No. 6, Jun. 2001, pp. 529-543.

He, et al., "Improved results for scheduling batched parallel jobs by using a generalized analysis framework," J. Parallel Distrib. Computing, vol. 70, Feb. 2010, pp. 173-182.

\* cited by examiner

ELASTIC SCALING FOR CLOUD-HOSTED BATCH APPLICATIONS

BACKGROUND

Cloud computing includes an attractive feature of elasticity. Elasticity is the ability to dynamically acquire or release resources based on demand. In other words, applications are allowed to pay only for the resources they use and to make scaling decisions without human intervention.

However, achieving efficient auto-scaling poses three key challenges. First, cloud systems find it difficult to quickly respond to increased demand as they incur significant start-up delay (on the order of tens of minutes) to launch new instances. Second, many applications exhibit bursty arrivals and non-uniform task execution times. Third, unexpected delays and provisioning failures due to the distributed execution environment in the cloud can reduce the efficiency of auto-scaling operations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the elastic scaling cloud-hosted batch application system and method performs automated elastic scaling of the number of compute instances for batch applications in a cloud computing environment. Embodiments of the system and method use the elastic scaling to minimize the job completion time and to minimize the dollar or monetary cost of resources consumed to execute the jobs. Embodiments of the system and method use a workload-driven approach to estimate the volume of work (or work volume) that is to be performed. This is based on task arrivals and job execution times.

Embodiments of the system and method use an adaptive controller to adapt the number of compute instances that are used at any given time under varying load and system conditions. This is an automatic system and method for auto-scaling the number of compute instances for cloud-hosted batch jobs. Embodiments of the system and method estimate the work volume as the cumulative sum of remaining execution time of tasks in the system. Given the work volume estimate, the adaptive controller dynamically adapts the number of compute instances to minimize the unified objective of cost and job completion time.

Embodiments of the system and method also mitigate startup delays in provisioning compute instances. The future work volume in the near future is predicted and additional compute instances are started gradually before they are needed. In addition, this gradual startup avoids turning on unnecessary compute instances so that the issue of transient load spikes is addressed. Moreover, embodiments of the system and method actively monitor task arrivals and execution times in order to adjust the number of compute instances under dynamic job characteristics and varying system conditions.

Embodiments of the system and method also ensure fairness and prioritization among batch applications and concurrently executing jobs. In particular, it is cost effective to share compute instances across multiple jobs because peak demand periods in one job may overlap with troughs in another job. Embodiments of the system and method provide a fair scheduling of job execution. This is achieved for each time interval by performing round-robin scheduling across jobs having the same priority, for each compute instance. Moreover, for each job, embodiments of the system and method determine a number of tasks to be processed based on the task execution times across jobs. A job with a given priority gets scheduled only after all jobs with higher priority have completed.

It should be noted that alternative embodiments are possible, and steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout.

DETAILED DESCRIPTION

In the following description of embodiments of an elastic scaling cloud-hosted batch application system and method reference is made to the accompanying drawings, which form a part thereof, and in which is shown by way of illustration a specific example whereby embodiments of the elastic scaling cloud-hosted batch application system and method may be practiced. It is to be understood that other embodiments may be utilized and structural changes may be made without departing from the scope of the claimed subject matter.

I. System Overview

Figure 1:
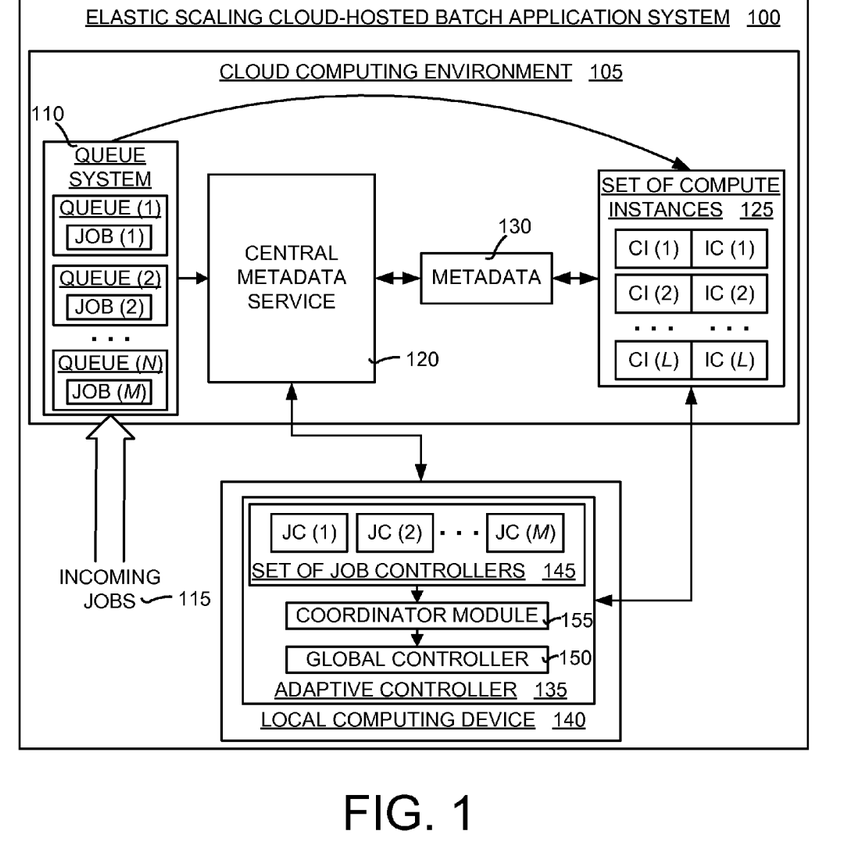
FIG. 1 is a block diagram illustrating a general overview of embodiments of the elastic scaling cloud-hosted batch application system and method implemented in a computing environment.

Embodiments of the elastic scaling cloud-hosted batch application system and method provide automatic elastic scaling of batch applications hosted on a cloud computing environment. FIG. 1 is a block diagram illustrating a general overview of embodiments of the elastic scaling cloud-hosted batch application system 100 and method implemented in a cloud computing environment 105.

As shown in FIG. 1, embodiments of the elastic scaling cloud-hosted batch application system 100 and method include a queue system 110 residing in the cloud computing environment 105. The queue system 110 includes a plurality of N number of queues, including a first queue (1), a second queue (2), and so forth, up to the Nth queue (N). Associated with each of the plurality of queues is M number of jobs, including a first job (1) in the first queue (1), a second job (2) in the second queue (2), to the Mth job (M) in the Nth queue (N). It should be noted that the number of jobs M may be equal to or less than the number of queues N, and that each job will have one associated queue. Moreover, in some situations M may be greater than N, such as when multiple jobs are mapped to the same queue. Incoming jobs 115 are input to the queue system 110 as controlled by embodiments of the elastic scaling cloud-hosted batch application system 100 and method. It should be noted that each job includes multiple tasks. Moreover, any of these multiple tasks may be executed at any give time by a compute instance.

A central metadata service 120 is in communication with the queue system 110 and receives information from for each job from the queue system 110. Also in the cloud computing environment 105 is a set of compute instances 125. The set of compute instances 125 includes L number of compute instances including a first compute instance CI (1), a second compute instance CI (2), to an Lth compute instance CI (L). Each compute instance includes an instance controller, such that the first compute instance CI (1) has a first instance controller IC (1), the second compute instance CI (2) has a second instance controller IC (2), and so on until the Lth compute instance CI (L) has an Lth instance controller IC (L).

Metadata 130 is exchanged between the central metadata service 120 and the set of compute instances 125. This metadata 130 may include job names, the execution time of each job, and the job duration. Moreover, the queue system 110 directly sends jobs in the queues to the set of compute instances 125 for execution.

Embodiments of the elastic scaling cloud-hosted batch application system 100 and method include an adaptive controller 135. The adaptive controller 135 resides on a local computing device 140. Although the embodiment shown in FIG. 1 illustrates the adaptive controller 135 residing on the local computing device, it should be noted that in some embodiments the adaptive controller 135 resides on a computing device (not shown) in the cloud computing environment 105. As shown in FIG. 1, the adaptive controller includes a set of job controllers 145 containing a plurality of job controllers. In particular, the set of job controllers 145 contains M number of job controllers, or one job controller for each job. The set of job controllers 145 includes a first job controller JC (1), a second job controller JC (2), and so forth to an Mth job controller JC (M).

The adaptive controller 130 also includes a global controller 150 in communication with the set of job controllers 145. A coordinator module 155 monitors the set of job controllers 145 and communicates with the global controller to manage the auto scaling decisions sent by the global controller 150. The central metadata service 120 is in communication with the adaptive controller 135 and sends information such as job execution time and input rate. The adaptive controller 135 also is in communication with the set of compute instances 125 in order to ascertain the demand for input jobs and adjust the number of compute instances needed to execute the jobs. The arrow between the adaptive controller 135 and the set of compute instances 125 indicates, among other things, that there are decisions, actuation, or both being executed.

II. Operational Overview

Figure 2:
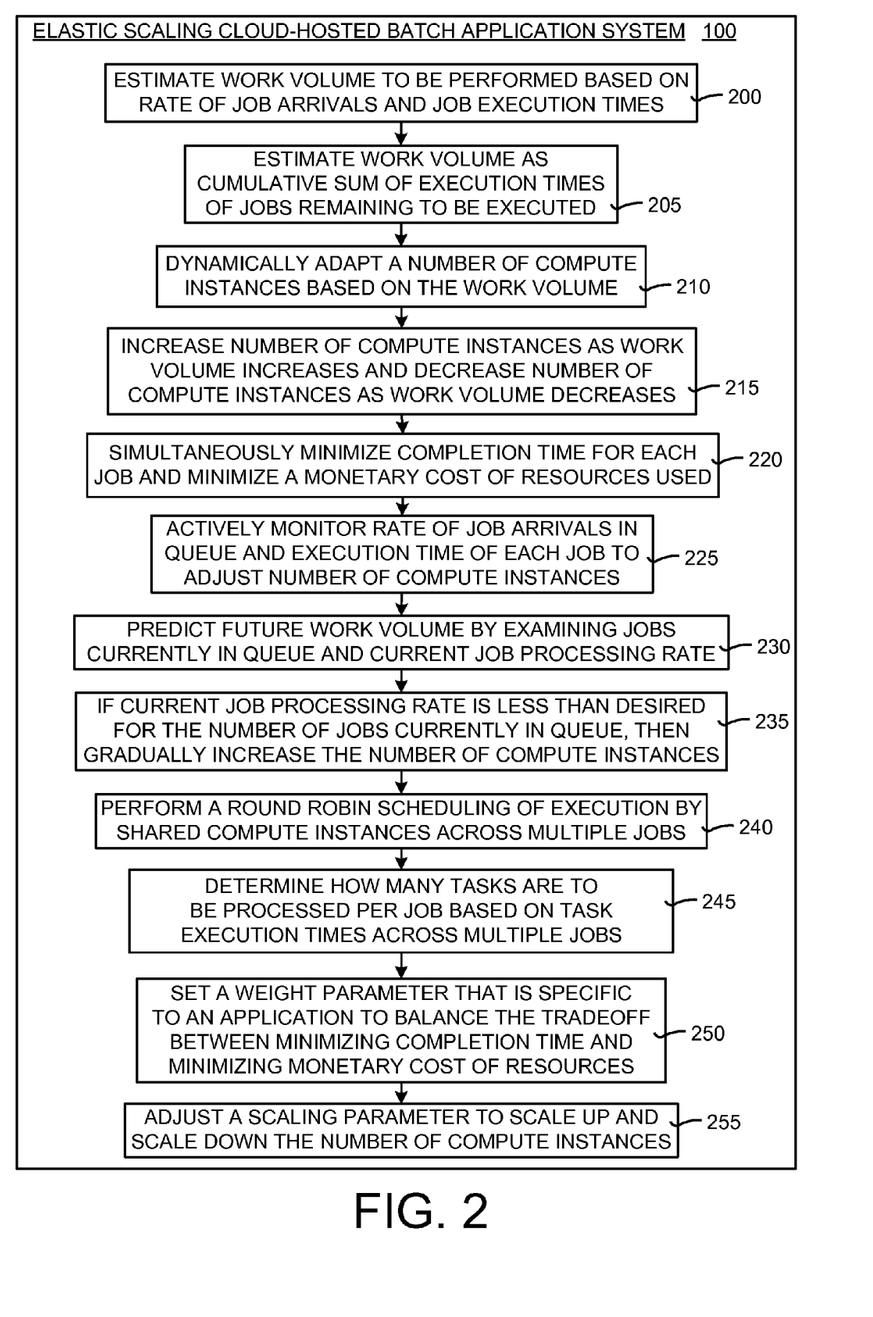
FIG. 2 is a flow diagram illustrating the general operation of embodiments of the elastic scaling cloud-hosted batch application system and method shown in FIG. 1.

FIG. 2 is a flow diagram illustrating the general operation of embodiments of the elastic scaling cloud-hosted batch application system 100 and method shown in FIG. 1. As shown in FIG. 2, the operation of embodiments of the elastic scaling cloud-hosted batch application method begins by estimating a work volume to be performed (box 200). In some embodiments, this estimation is based on the rate at which jobs to be executed arrive at the queue system 110 and the execution time for each of those jobs.

The work volume may be determined in a variety of different ways. One way in which the work volume may be estimated is as a cumulative sum of execution times of jobs remaining to be executed (box 205). As noted above, jobs include tasks whose execution time on a compute instance is measured. The work volume is cumulative sum of task execution times remaining to be executed for a job. Then, based on the work volume, embodiments of the method dynamically adapt the number of compute instances that are needed to execute the jobs (box 210). This involves increasing the number of compute instances as the work volume increases, and decreasing the number of compute instances as the work volume decreases (box 215).

Embodiments of the elastic scaling cloud-hosted batch application method seek to simultaneously minimize completion times for each job while also minimizing the monetary cost of the resources used to execute the jobs (box 220). In some embodiments, the method actively monitors the rate at which jobs arrive at the queue system 110 and the corresponding execution times for each of those jobs (box 225). This is used to adjust the number of compute instances accordingly.

Future work volume can be predicted by examining jobs currently in the queue system 105 and the current job processing rate (box 230). If the current job processing rate is less than a desired job processing rate (based on the number of jobs currently in the queue system 110), then the number of compute instances is gradually increased (box 235). This mitigates startup delays of compute instances while ensuring that a temporary spike in work volume does not increase the number of compute instance drastically.

To handle multiple jobs, embodiments of the elastic scaling cloud-hosted batch application method perform a round robin scheduling of job execution by shared compute instances across multiple jobs (box 240). This involves determining how many tasks are to be processed per job based on the task execution times across the multiple jobs (box 245). Moreover, a weight parameter can be defined for specific applications such that one application's weight parameter is different from another application's weight parameter (box 250). This serves to balance the tradeoff between minimizing completion time and minimizing monetary cost of resources used. It should be noted that the weight parameter does not directly affect a priority of a specific application. Further, in some embodiments of the elastic scaling cloud-hosted batch application method a scaling parameter is used to scale up and scale down the number of compute instances (box 255).

III. Operational Details

The operational details of embodiments of the elastic scaling cloud-hosted batch application system 100 and method will now be discussed. This includes the operation of a job controller 300 (which is an exemplary embodiment of the job controllers contained in the set of job controllers 145), the global controller 150, an instance controller 500 (which is an exemplary embodiment of the instance controllers IC (1) to IC (L)), and the central metadata service 120.

III.A. Preliminaries

Before discussing the details of embodiments of the elastic scaling cloud-hosted batch application system 100 and method, a few preliminaries will be discussed. Embodiments of the system 100 and method focus on hosting batch jobs in the cloud computing environment 105. Note that in this document the terms "job" and "application" are used interchangeably. Jobs arrive (or are submitted by users) to the cloud system online over time. Job j has a work requirement $w_j$, which is the time it would take to complete the job on a unit speed machine.

Each job comprises multiple tasks which are organized in phases and arrive over time. Tasks in a phase depend on the results computed by the tasks in the previous phase and can run in parallel up to a certain degree. A task is defined as an atomic unit of computation with a fixed input, and a task is the finest granularity of parallelization. A phase is defined as a collection of tasks that can run in parallel (such as shuffle and reduce). An outlier is defined as a task that takes longer to finish compared to other tasks in the phase. A workflow is defined as a directed acyclic graph denoting how data flows between phases and a job as an execution of the workflow.

A task i has an arrival time $a_i$ and (possibly unknown) processing time $p_i$. Let $d_i = a_i + p_i$ be the earliest possible completion time of task i. Each task runs on a single compute instance (in other words, a server or a virtual machine) until completion. For simplicity, it is assumed that all instances are homogeneous and preemption of tasks are not considered. Each instance can run a single task at a time and different tasks can run in parallel on different instances. Dynamic resource allocation is performed by activating or shutting down compute instances. To add an instance, it takes $T_{setup}$ time (in some embodiments between 10-20 minutes) until the instance is available to process tasks. Note that the problem is trivial if $T_{setup}=0$, since a compute instance can be instantaneously allocated for each incoming task and released upon completion. In other words, each task i arriving at $a_i$ completes at $d_i$.

Similarly, it takes $T_{shutdown}$ time (about 1-2 minutes in some embodiments) to turn off an instance. The instance may become unavailable immediately after receiving a signal to shut down.

Embodiments of the elastic scaling cloud-hosted batch application system 100 and method are designed to maximize performance and minimize cost when executing a batch application in the cloud. Regarding performance, the touchstone is to minimize the total job completion time (also called makespan) from the arrival of the first task till the last finishing task in the job in order to maximize performance. Assuming that the arrival of the first task is at time 0, the job completion time is denoted as T.

Regarding the cost, the touchstone is to minimize the total dollar (or other monetary unit) cost of computing resources used in executing the job. Cloud providers charge a fixed cost (say C) per compute instance per unit time (such as, for example, 20 cents per instance per hour). Thus, the dollar cost incurred in processing the job is computed as the integral of the number of instances used N(t) at time t from the start till finish of the job. In practice, however, cloud platforms round up the time used by a compute instance to hourly boundaries so the total cost may be higher.

Mathematically, the dollar cost, D, is given by the equation:

$$D = c * \int_{t=0}^{t=T} N(t) dt.$$

These two benchmarks are combined to in a weighted linear combination to define the optimization goal as, Objective: MIN $\alpha*D + (1-\alpha)*T$      (1)

where, $\alpha \in [0,1]$.

Other variants of this formulation such as,

Minimize D s.t. $T \leq T^{deadline}$, and

Minimize T s.t. $D \leq D^{budget}$, and bi-criteria(D,T), are also possible.

Note that there is a tradeoff between the job completion time T and the dollar cost D. Setting the number of instance to one, such that $\forall t: N(t) = 1$, minimizes the dollar cost but may significantly delay job completion. On the other hand, setting, $\forall t: N(t) = \infty$, (or a large constant) will minimize the job completion time at a high cost. Thus, there is a tradeoff between cost and completion time.

III.B. Adaptive Controller

The adaptive controller 135 of embodiments of the elastic scaling cloud-hosted batch application system 100 and method will now be described. An overview of the controller 135 will be presented first, followed by a detailed description of the controller 135 and its associated components.

III.B.1. Adaptive Controller Overview

In order to solve the optimization problem given in Equation (1), the adaptive controller determines the resource demands for input jobs and adjusts the number of instances N(t) to run their tasks. In other words, the adaptive controller 135 determines whether to launch new instances in case of overload or release some instances in case of excess capacity.

Specifically, embodiments of the adaptive controller 135 seek to accomplish the following. First, the adaptive controller 135 adapts compute capacity to balance the tradeoff between cost and performance targets of individual jobs. Second, the adaptive controller 135 should perform auto-scaling in an automated manner under dynamic workloads and cloud system conditions. Finally, the adaptive controller 135 ensures a fair allocation of resources among concurrent jobs.

Based on the above, embodiments of the adaptive controller 135 have a three-layer control system that includes the global controller 150, a job controller per job, and an instance controller for each compute instance (that are also called worker nodes).

For each job there is a job controller whose adapts the amount of resources allocated to the job to meet its cost and performance targets. Moreover, each job controller forwards its estimated resource requirements to global controller 150, which makes global decisions to allocate resources. Each compute instance has an instance controller that arbitrates among multiple queues, one queue per job, and allocates its execution time as determined by the global controller 150.

For each job, its runtime performance metrics (such as task arrivals and execution times) are collected at the central metadata service 120. The job controller queries this service at periodic intervals to determine the difference between the current resource allocation and resources needed to meet the optimization goal. Then it computes the desired change in the number of compute instances and sends it to the global controller 150 for resource allocation in the next time interval.

The global controller 150 aggregates resource requirements across all job controllers and actuates decisions to adapt the total number of compute instances. Further, the global controller 150 adapts the scheduling policy across instance controllers to ensure fairness among concurrent jobs.

III.B.2. Job Controller

Figure 3:
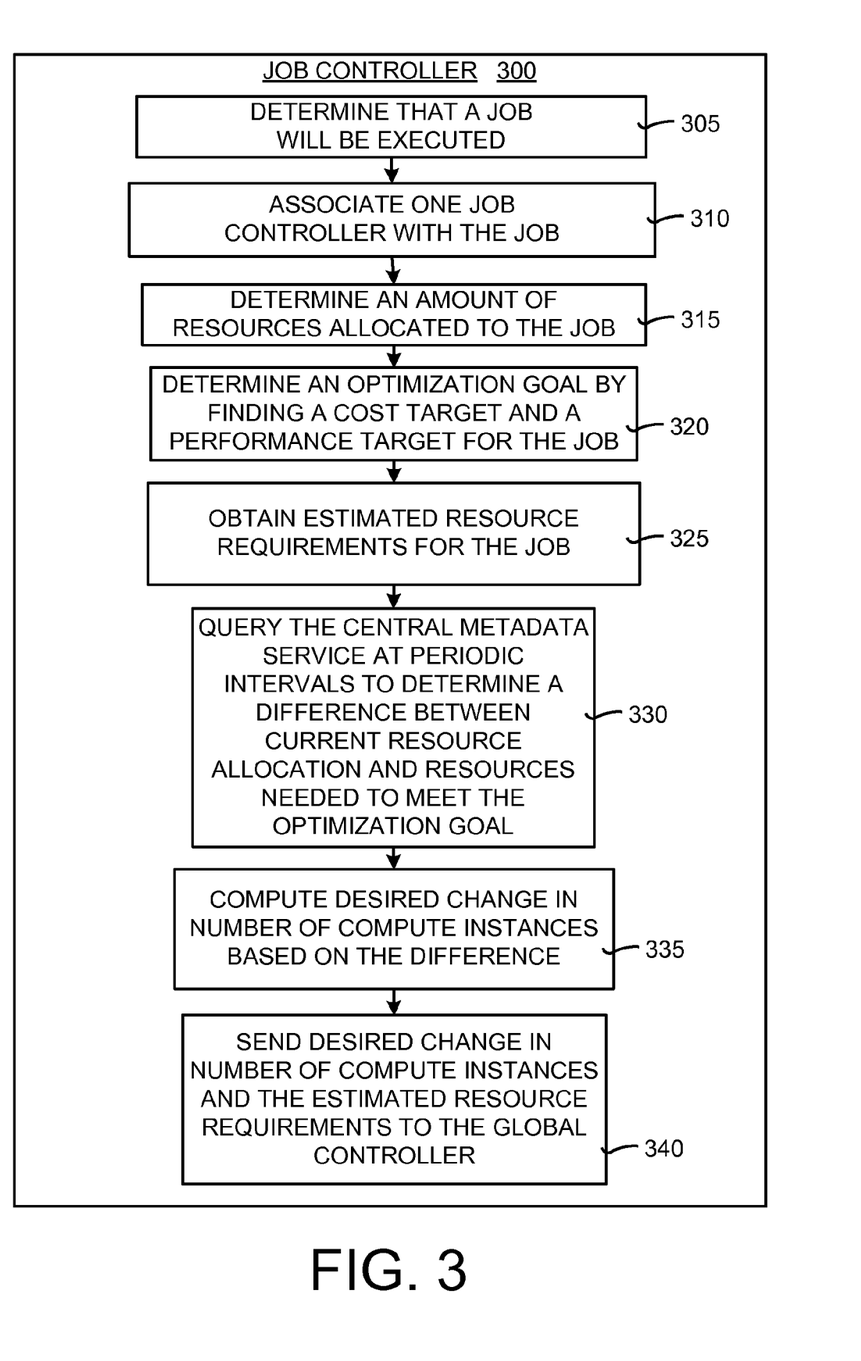
FIG. 3 is a flow diagram illustrating the operational details of embodiments of a job controller that is an exemplary embodiment of the set of job controllers shown in FIG. 1.

FIG. 3 is a flow diagram illustrating the operational details of embodiments of a job controller 300 that is an exemplary embodiment of the set of job controllers 145 shown in FIG. 1. The operation of the job controller 300 begins by determining that a job will be executed (box 305). A job controller 300 is associated with each job (box 310).

Next, the job controller 300 determines an amount of resources allocated to the job (box 315). Moreover, the controller 300 determines an optimization goal by find a cost target and a performance target for the job (box 320). Resource requirements for the job are estimated by the controller 300 in order to obtain estimated resource requirements (box 325).

The job controller 300 then queries the central metadata service 120 at periodic intervals to determine a difference between a current resource allocation and the resources needed to meet the optimization goal (box 330). A desired change in the number of compute instances then is computed based on the difference (box 335). This desired change in the number of compute instances and the estimated resource requirements are then sent to the global controller 150 (box 340).

In mathematical terms, the job controller 300 determines the number of instances N(t) at any time t, to balance the cost versus performance tradeoff for the submitted job. Note that queuing theory is not applicable to this problem for two reasons. First, the number of compute instances is not fixed. Second, the task arrival rate and service rate can change significantly over time. As a result, the system dynamics would be difficult to model under varying workloads.

Under a uniform distribution of task arrival rate and execution times, the compute capacity can be set to match the input load such that queue length remains constant. However, under bursty load patterns, the queue length can vary significantly, thereby affecting both the job completion time and the dollar cost of running compute instances. Because of this, embodiments of the job controller 300 use adaptive resource allocation under dynamic workloads and system conditions.

In order to adapt the compute capacity to dynamic workloads, the job controller 300 logically separates the workload into two components: (1) tasks waiting in the queue; and (2) task arrivals over time. In the first case, for transient load bursts resulting in a large number of enqueued tasks, it is desirable to process them at the earliest because this strategy reduces the job completion time without affecting the cost. In the second case, for processing task arrivals over time, it suffices to provision the minimum number of instances needed to handle the input rate. In this way, the cost is reduced but the job completion time remains unaffected.

Based on this partitioning, the total compute capacity is divided into two parts to process each load component. The first part is the queue workers number (denoted as $NQ_t$), which is the number of instances (called "queue workers") to process the enqueued tasks. The second part is the input workers number (denoted as $N\lambda_t$), which is the number of instances (called "input workers") to process the task arrival rate $\lambda(t)$ at time t. It should be noted that this partitioning is logical, so that a compute instance simply selects the next available task from the job queue for processing. Their sum gives the total number of compute instances, given mathematically as, $$N(t)=N_t=NQ_t+N\lambda_t \qquad (2).$$

In order to adapt $NQ_t$ and $N\lambda_t$, the workload partitioning model is leveraged to combine closed-loop control for steady load patterns (in well-modeled operating regimes) and open-loop control for transient load spikes (in hard-to-model regimes). Specifically, the job controller 300 uses an optimization controller to estimate $NQ_t$ and uses integral gain control theory to adjust $N\lambda_t$.

Calculating the Queue Workers Number ($NQ_t$)

In order to estimate the number of queue workers, $NQ_t$, at time t, the objective function is modified to treat resource costs in terms of the volume of total processing time of pending tasks, and to omit c as it is a constant factor to convert the execution time into dollar costs. Mathematically, this is given by the equation, $$\text{MIN } E=\alpha * \int_0^T N(t)dt+(1-\alpha)*T \qquad (3).$$

The expected additional time $\Delta T$ to process $|Q_t|$ new enqueued tasks using $NQ_t$ number of instances is equal to the sum of, $$\frac{Q_t}{\mu * NQ_t},$$

(where $\mu$ is the service rate) and $T_{setup}+T_{shutdown}$. In other words, the time taken to provision the compute instances.

Therefore, the incremental change in the objective function becomes, $$\Delta E = \alpha * NQ_t * \left(\frac{Q_t}{\mu * NQ_t} + T_{setup} + T_{shutdown}\right) +$$
$$(1 - \alpha) * \left(\frac{Q_t}{\mu * NQ_t} + T_{setup} + T_{shutdown}\right).$$

Taking the differential, $$\frac{d(\Delta E)}{dNQ_t},$$

and setting it to zero, yields a closed form and computationally inexpensive optimal solution to minimize $\Delta E$:

$$NQ_t = \sqrt{\frac{(1-\alpha)*Q_t}{\alpha * \mu *(T_{start}+T_{shutdown})}}. \qquad (4)$$

Note that for scale-in, an NQt instance is allowed to shut down only when it is idle and the job queue is empty.

Calculating the Input Workers Number ($N\lambda_t$)

The input workers number, $N\lambda_t$, is set so that there is enough computational capacity to handle the input rate given the distribution of observed task execution times. At the beginning of the control interval k starting at time t, the controller 300 takes as input the measured average service rate $\mu_{k-1}$ (defined as the number of tasks processed per second) across running instances during the previous interval and its desired value $\mu(ref)$ to process the input rate.

The job controller 300 measures the error difference between the current and desired values as, $$e_{k-1} = N\lambda_{k-1} * \frac{(\mu_{k-1} - \mu(ref))}{\mu(ref)}. \quad (5)$$

Intuitively, if $\mu_{k-1}$ exceeds $\mu(ref)$, then the system is currently over-provisioned (the task processing rate is higher than desired rate) and hence can scale-in the number of compute instances, and vice-versa. Based on the error term, the number of compute instances $N\lambda_t$ is calculated using the following control law:

$$N\lambda_t = N\lambda_k = N\lambda_{k-1} - G_k * e_{k-1} \quad (5)$$

where $G_k$ denotes the integral gain parameter that determines how aggressive the controller is in correcting the observed error. The value of $G_k$ adapts automatically to varying workload by setting, $$G_k = 1/\alpha * (1 - \beta * e^{-\gamma * |e_{k-1}|}),$$

where, $$\alpha \geq 1, 0 < \beta \leq 1, 0 < \gamma \leq 1$$

are tunable constants. Intuitively, when the error is small, $G_k$ provides dampening of the term, $$G_k * e_{k-1}$$

to avoid oscillations and when the error is large, it modulates the speed of convergence together with change in $N\lambda_t$. In comparison to a standard integral controller that has a fixed G value, the job controller 300 self-tunes the gain parameter to balance the tradeoff between convergence, stability and efficiency of the closed-loop control system.

Note that the above control law assumes that $N\lambda_k$ is a continuous variable. Therefore, to avoid oscillations due to discretization of $N\lambda_k$ values, $\mu(ret)$ is mapped into a range [$\mu_l$, $\mu_h$] where the controller will actuate $N\lambda_k$ only if $\mu_{k-1}$ exceeds $\mu_h$ implying over-provisioning or when $\mu_{k-1}$ falls below $\mu_l$, implying underprovisioning.

In particular, $$N\lambda_k - N\lambda_{k-1} = \begin{cases} G_k N\lambda_{k-1} \frac{(\mu_h - \mu_{k-1})}{\mu_h} & \text{if } \mu_h < \mu_{k-1} \\ G_k N\lambda_{k-1} \frac{(\mu_l - \mu_{k-1})}{\mu_l} & \text{if } \mu_l > \mu_{k-1} \\ 0 & \text{otherwise} \end{cases} \quad (6)$$

Note that static value settings of $\mu_h$ and $\mu_l$ may lead to oscillations when $\mu_h - \mu_l$ is too small, and slow adaptation leading to high resource costs when it is too large. Therefore, $\mu(ref) = \mu_h$ and proportional thresholding is used to vary the range of $\mu_l$.

Mathematically, $$\mu_l = \mu_h * \left(\frac{N\lambda_{k-1} - 1}{N\lambda_{k-1}}\right)^r; r = 1, 2, \ldots .$$

This setting ensures the stability property that when $N\lambda_k$ increases by one under $\mu_l > \mu_{k-1}$, then the new $\mu_k$ will stay below $\mu_h$ to avoid oscillations. The term $\mu_h$ is set empirically as the inverse of the median quantile on the observed task execution times.

To provide proactive provisioning, the job controller 300 uses an estimate of the input load $\lambda(t)$ to decide the resource entitlement for the next interval. Specifically, it computes the expected service rate in the next control interval as, $$\mu_k = \frac{\int_{t_k}^{t_{k+1}} \lambda(t) dt}{[t_k, t_{k+1}] * N\lambda_t}. \quad (7)$$

A standard low-pass filter is used to separate transient spikes from the steady load patterns.

III.B.3. Global Controller

Given the collective requests from the set of job controllers 145, the global controller 150 adapts the number of compute instances to meet their demand. In addition, the global controller 150 actuates these decisions by calling auto-scaling APIs provided by the cloud platforms. In order to run multiple jobs, each job is treated separately as an independent queue that is controlled by its individual job controller 300.

Figure 4:
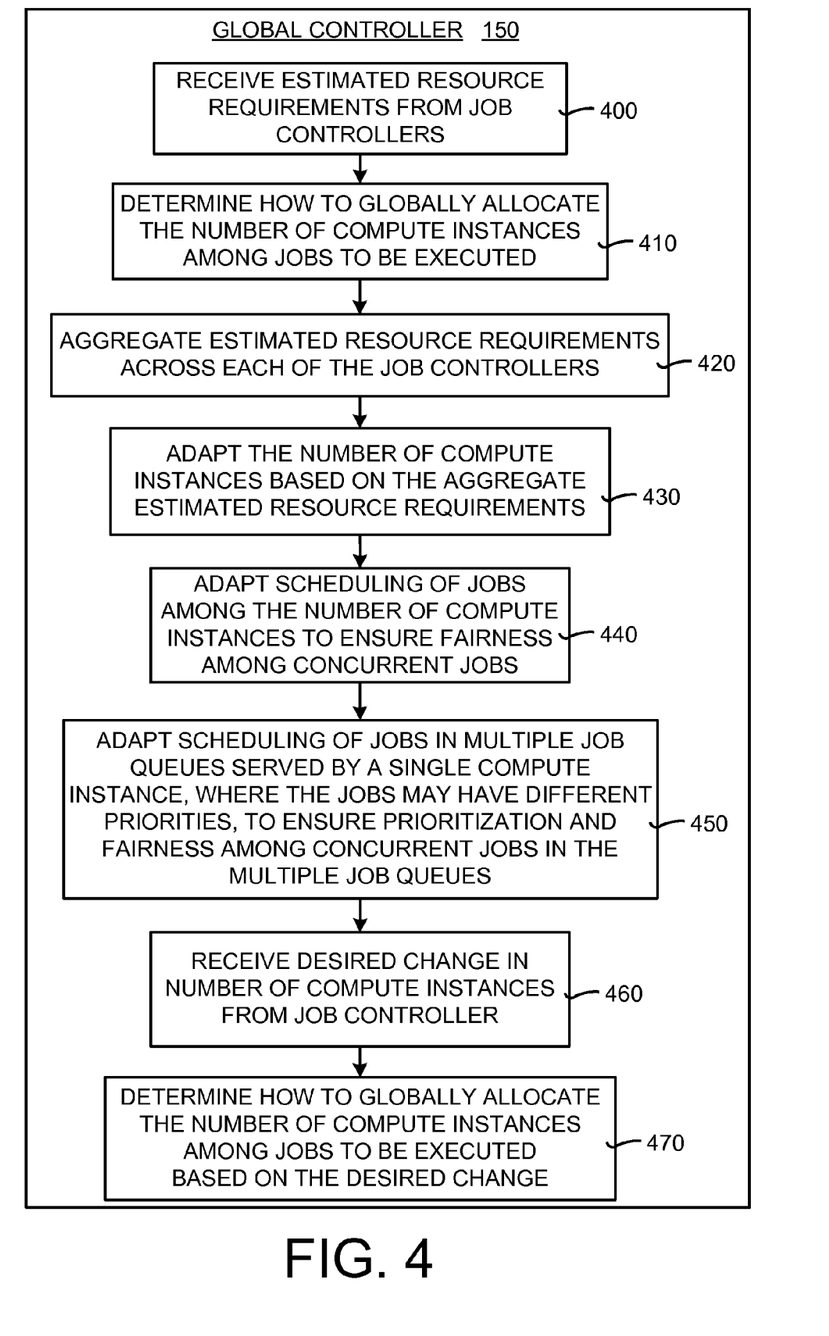
FIG. 4 is a flow diagram illustrating the operational details of embodiments of the global controller shown in FIG. 1.

FIG. 4 is a flow diagram illustrating the operational details of embodiments of the global controller 150 shown in FIG. 1. The operation of the global controller 150 begins by receiving estimated resource requirements from each job controller 300 in the set of job controllers 145 (box 400). The global controller 150 uses this information to determine how to globally allocate the number of compute instances among each of the jobs to be executed (box 410).

The global controller 150 aggregates the estimated resource requirements across each of job controller 300 in the set of job controllers 145 (box 420). The number of compute instances then is adapted based on the aggregate estimated resource requirements (box 430). Moreover, the scheduling of jobs is adapted among the number of compute instances in order to ensure fairness among jobs that are being executed concurrently (box 440). In addition, the scheduling of jobs in multiple jobs queues served by a single compute instance is adapted to ensure priority and fairness among concurrent jobs in the multiple job queues (box 450). As explained below with reference to FIG. 6, some jobs may have a higher priority than other jobs, and those jobs with the same priority are treated fairly.

At the next interval, the global controller 150 may receive from the job controller 300 a desired change in the number of compute instances (box 460). This may be because the number of jobs has increased or decreased, the execution time for jobs has increased or decreased, or any combination of the preceding. Based on this desired change, the global controller 150 determines how to globally allocate the number of compute instances among the jobs to be executed (box 470). This automatic adaptation and scaling continue to occur over subsequent time intervals.

In mathematical terms, the global controller 150 computes the total number of compute instances $N_t$ as the sum aggregate of queue workers and input workers across jobs. This can be written as, $$N_t = \sum_{i=Job1}^{Jobn} NQ_t^i + N\lambda_t^i. \quad (8)$$

In order to ensure fairness among concurrent jobs, the global controller 150 multiplexes the computing resources across active jobs to reduce costs because the high demand periods in one job may overlap with low demand periods in the other. One challenge is to ensure fairness in allocating computing resources between them. Embodiments of the elastic scaling cloud-hosted batch application system 100 and method provide an effective scheduling policy that partitions the computing capacity evenly among the unfinished jobs. Specifically, at the beginning of the control interval k, the global controller 150 computes the 90th percentile of the task execution times $p_j$ for each job j and then takes their max $p_{max}$.

III.B.4. Instance Controller

Figure 5:
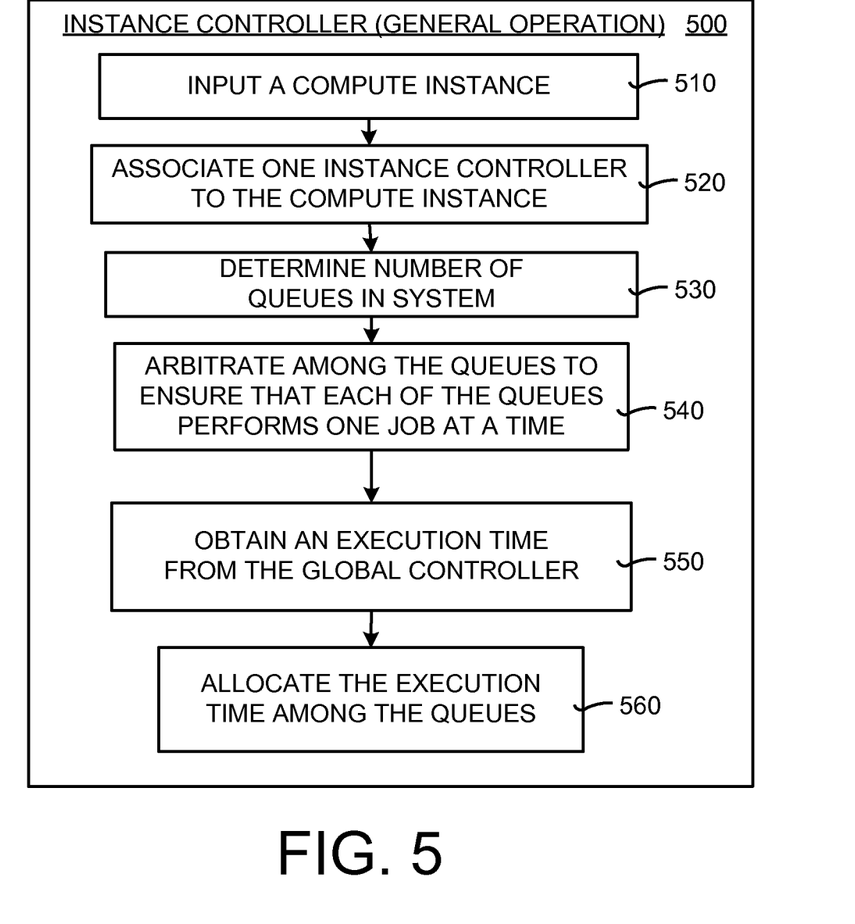
FIG. 5 is a flow diagram illustrating the general operation of embodiments of an instance controller that is an exemplary embodiment of the instance controllers shown in FIG. 1.

FIG. 5 is a flow diagram illustrating the general operation of embodiments of an instance controller 500 that is an exemplary embodiment of the instance controllers, IC (1) to IC (L), shown in FIG. 1. Operation of the instance controller 500 begins by inputting a compute instance (box 510) and associating one instance controller 500 with the computer instance (box 520). This is performed for each compute instance such that each compute instance has one associated instance controller.

Next, the instance controller 500 determines a number of queues in the queue system 110 (box 530). The instance controller 500 then arbitrates among the queue in the queue system 110 to ensure that each of the queues performs just one job at a time (box 540). The instance controller 500 then obtains an execution time from the global controller 150 (box 550) and allocates the execution time among the queues (box 560).

This allocation is performed using a scheduling policy. In some embodiments this scheduling policy is a round-robin scheduling policy. Mathematically, each instance controller 500 performs a round-robin scheduling of job queues and uses the ratio, $$\left\lceil \frac{p_{max}}{p_j} \right\rceil$$

as a measure of the number of tasks to be processed from queue j during that interval. This technique performs within a constant factor of the optimal scheduler in terms of average makespan (or the time duration between job release and completion). This is provided that the interval is long enough. If job queues have different priorities, then an instance controller 500 processes a job queue only after all higher-priority jobs have been completed.

Figure 6:
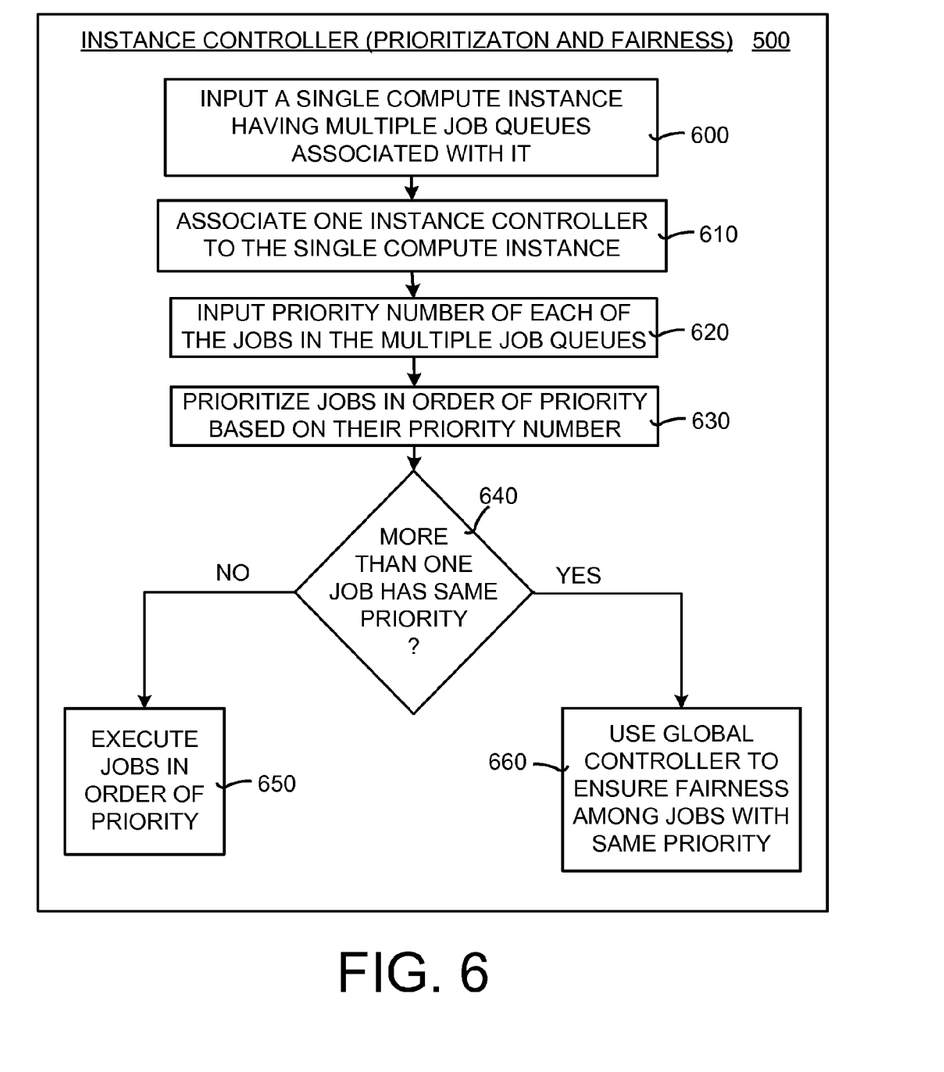
FIG. 6 is a flow diagram illustrating the detailed operation of embodiments of the instance controller shown in FIG. 5 to ensure prioritization and fairness.

FIG. 6 is a flow diagram illustrating the detailed operation of embodiments of the instance controller 500 shown in FIG. 5 to ensure prioritization and fairness. Referring to FIG. 6, the instance controller 500 inputs a single compute instance having multiple job queues associated with the single compute instance (box 600). Next, a one instance controller is assigned or associated with the single compute instance (box 610).

A priority number for each of the jobs in the multiple job queues then are input (box 620). The jobs then are ordered in order of priority based on their priority number (box 630). A determination then is made as to whether any jobs have the same priority number, meaning that they have the same priority (box 640). If not, then the jobs are executed in order of priority, with the job having the highest priority executed first (box 650). In other words, a job with a given priority is executed only if all higher priority jobs have finished execution. For jobs with the same priority, the global controller is used to ensure fairness among these jobs (box 660). This fairness approach was set forth above with regard to FIG. 4.

III.C. Central Metadata Service

The central metadata service 120 of embodiments of the elastic scaling cloud-hosted batch application system 100 and method will now be described. In general, the service 120 is designed to store and provide both task and job metadata as well as compute instance metadata. This metadata allows the adaptive controller 135 to make automatic scaling decisions.

Figure 7:
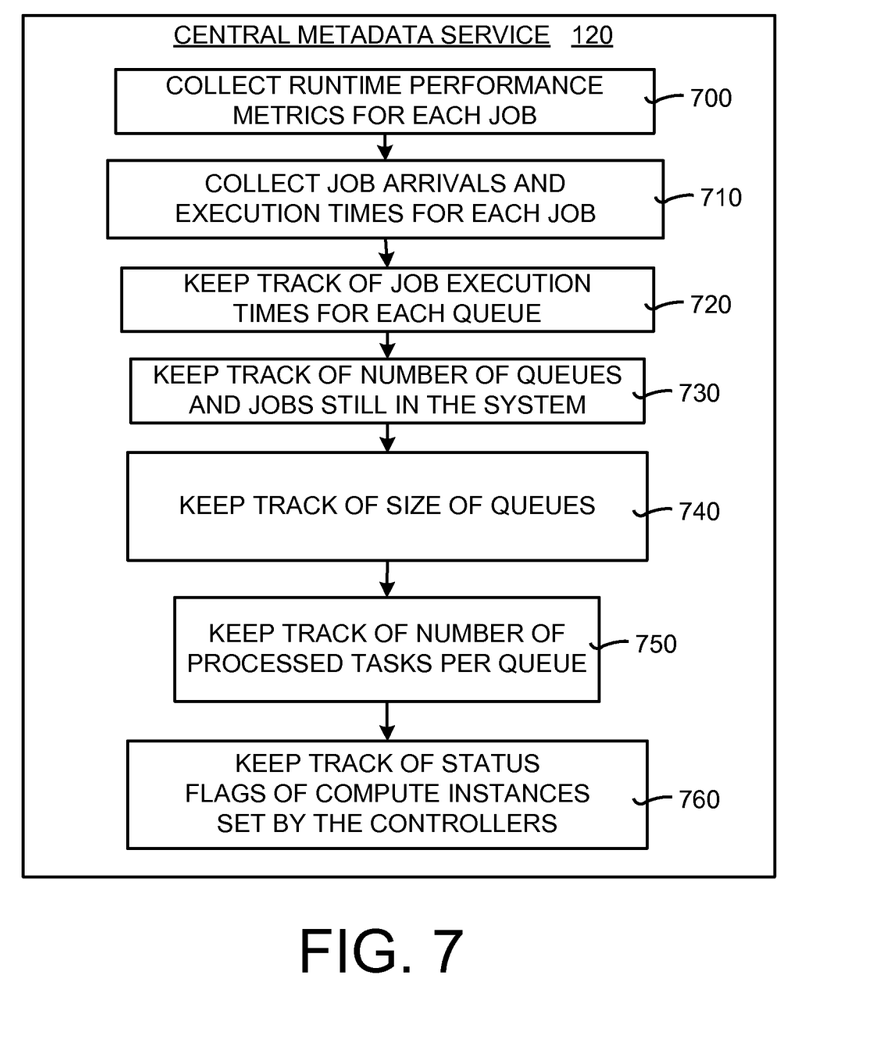
FIG. 7 is a flow diagram illustrating the operational details of embodiments of the central metadata service shown in FIG. 1.

FIG. 7 is a flow diagram illustrating the operational details of embodiments of the central metadata service 120 shown in FIG. 1. Referring to FIG. 7, the central metadata service 120 collects runtime performance metrics for each job being executed (box 700). In addition, the service 120 collects job arrivals and execution times for each job (box 710).

The service 120 also keeps track of the job execution times for each queue in the queue system 110 (box 720) and the number of queues and jobs that are still in the system (box 730). The size of queues is kept track of by the service 120 (box 740), as well as the number of processed tasks for each queue (box 750). The central metadata service 120 also keeps track of status flags set by the controllers (box 760). In some embodiments these status flags are stop flags that are used to signal the compute instances to shut down.

III.D. Other Issues

Some issues that may arise during implementation and operation of embodiments of the elastic scaling cloud-hosted batch application system 100 and method will now be discussed.

III.D.1. Blocking Reconfiguration Operation

Specific to the Platform-as-a-Service (PaaS) model in Windows® Azure®, which are registered trademarks of the Microsoft Corporation located in Redmond, Wash., a new reconfiguration operation is blocked until the previous operation has completed. As a result, the controller needs to balance the benefits of making fast reconfiguration decisions and the opportunity cost in not being able to actuate decisions during a significant load fluctuation in the future while a reconfiguration is pending. In other models, however, the reconfiguration operations may be non-blocking as virtual machine (VM) instances can be independently provisioned and released.

III.D.2. Scalability

The central metadata service 120 and global controller 150 may become a bottleneck in the system with a large number of jobs and computing instances. To improve scalability, embodiments of the elastic scaling cloud-hosted batch application system 100 and method use several existing techniques. One technique is allocating multiple compute instances to serve as the central metadata service 120, using consistent hashing to load-balance queues and metadata stored among them. Another technique is using an aggregation tree to aggregate requests in which job controllers act as leaves and the global controller 150 acts as the root.

III.D.3. Provisioning Delays and Failures

At times there is a wide variation in the reconfiguration time arising from actuator lag in virtual machine (VM) provisioning. In order to preserve stability during adjustments, embodiments of the elastic scaling cloud-hosted batch application system 100 and method provide a coordinator module 155 that manages the dependency between the auto-scaling decisions sent by the global controller 150 and their actuation. Specifically, the coordinator module 155 actively monitors the actions of the job controllers contained in the set of job controllers 145. Moreover, upon failure, the coordinator module 155 retries them. On completion (or after a timeout), the coordinator module 155 sends a notification to the global controller 150.

III.D.4. Pricing Based on Hourly Charging

Commercial cloud platforms charge for compute instances by hour (by rounding up their execution time). Thus, for scale-in, it is desirable to shut down an instance only if it is idle and its running time is close to an hourly boundary based on the start time.

Embodiments of the elastic scaling cloud-hosted batch application system 100 and method define a shutdown time window (such as, for example, 10 minutes to the hourly boundary but greater than $T_{shutdown}$) to decide when to shut down an instance. Embodiments of the elastic scaling cloud-hosted batch application system 100 and method use two Boolean variables per instance. Namely, a stop flag and a delete flag.

A stop flag indicates whether a worker is a candidate for deletion. Before picking the next task to process (or periodically), each compute instance checks if its stop flag is set and whether its running time falls within the shutdown window. In that case, the compute instance sets the delete flag marking itself to be shut down. Otherwise, it continues picking up new tasks. The coordinator module 155 can release all instances whose delete flags are set. In case of scale-out, the coordinator module 155 first recycles the instances marked for deletion by simply resetting their flags.

Windows® Azure® does not provide a direct control over which instances to shut down. It was observed that the runtime system selects instances in decreasing order of the instance identifications (ID's) for shutdown. This observation is used to scale-in by setting status flags (such as stop flags) for workers in that order. Other models, however, may allow a specific virtual machine to be terminated.

The utility pricing model in Windows® Azure® charges based on clock hour boundaries instead of hourly boundaries as in other models. In particular, a compute instance started, say, at 2:35 pm will be charged for one hour till 3 pm and then subsequently charged on clock hourly boundaries from 3 pm to 4 pm, from 4 pm to 5 pm, and so on.

Although this model is clearly more restricted, it simplifies when to actuate the auto-scaling decisions. In particular, the scale-in decisions for all running instances only need to be made about $T_{shutdown}$ before each clock hour boundary. The scale-out decisions can still be made during the hour at the cost of increasing overhead (due to full hour charging) but this may reduce the job completion time.

III.E. Other Embodiments

This section discusses alternate embodiments of the elastic scaling cloud-hosted batch application system 100 and method.

III.E.1. Balancing Tradeoff Between Cost and Performance

The optimization problem considered in this document aims to minimize a weighted combination of cost and completion time. In order to balance the tradeoff between these metrics, some embodiments of the elastic scaling cloud-hosted batch application system 100 and method allow applications to set a weight parameter α in an application-specific manner. The weight parameter is specific to the batch application and is tuned for the batch application to balance the tradeoff between minimizing a completion time and minimizing a monetary cost of resources used to execute the jobs.

On one hand, for applications like web search, completion time is relatively more important because even a small fraction of stale results can lead to a significant loss in revenue through a reduction in purchases, search queries, or advertisement click-through rates. On the other hand, for scientific applications, low costs and job completion within a deadline are preferable. Further, a related challenge in these embodiments is how to set the deadlines such that resource costs remain reasonable.

III.E.2. Leveraging Offline Job Information

In many batch applications the directed acyclic graph (DAG) of job execution is known a priori as it is generated by a compiler. The auto-scaling technique in some embodiments of the elastic scaling cloud-hosted batch application system 100 and method can leverage the compile-time metadata such as the number of tasks in each phase, the communication pattern between mapper and reducer tasks, and the expected task execution times, to infer the resource requirements before executing the job. Thus, by integrating the offline job information with online resource allocation, the adaptive controller 135 should be able to make better auto-scaling decisions.

III.E.3. Scale-Out, Scale-In and Scale-Up, Scale-Down

Some embodiments of the elastic scaling cloud-hosted batch application system 100 and method include a scale-out/scale-in scaling knob and a scale-in/scale-out for auto-scaling. The scale-out/scale-in scaling knob adjust a scale-out/scale-in parameter that allows the number of compute instances to be increased (scale-out) or decreased (scale-in). The scale-up/scale-down knob adjusts a scale-up/scale-in parameter that serves to adjust the number of resources allocated to a given compute instance. These resources include, for example, CPU, memory, disk, network, and so forth.

For compute-intensive applications, the total completion time can be reduced by up to 50% by replacing small VM instances by medium ones, which have relatively two times more central processing unit (CPU) capacity but cost twice as much. Similarly, the completion time can be further reduced if large VM instances are used. Note that in all cases, the dollar costs for consumed resources would be roughly the same. The difference may arise due to pricing based on discrete per-hour charging intervals.

IV. Exemplary Operating Environment

Figure 8:
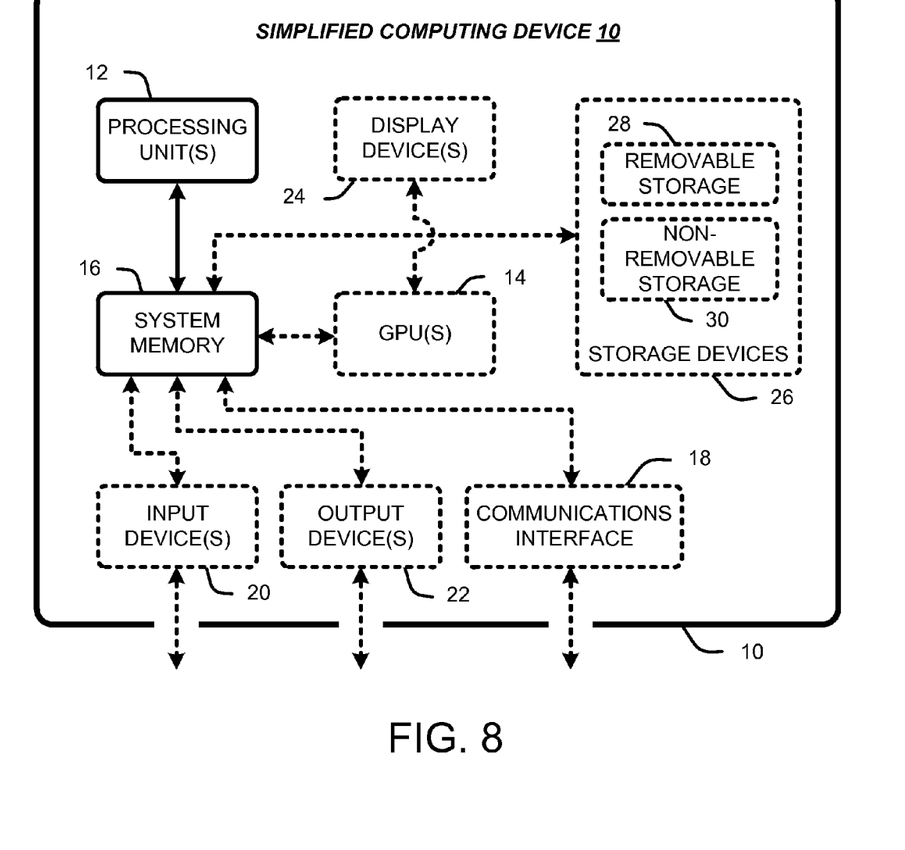
FIG. 8 illustrates a simplified example of a general-purpose computer system on which various embodiments and elements of the elastic scaling cloud-hosted batch application system and method, as described herein and shown in FIGS. 1-7, may be implemented.

Embodiments of the elastic scaling cloud-hosted batch application system 100 and method described herein are operational within numerous types of general purpose or special purpose computing system environments or configurations. FIG. 8 illustrates a simplified example of a general-purpose computer system on which various embodiments and elements of the elastic scaling cloud-hosted batch application system and method, as described herein and shown in FIGS. 1-7, may be implemented. It should be noted that any boxes that are represented by broken or dashed lines in FIG. 8 represent alternate embodiments of the simplified computing device, and that any or all of these alternate embodiments, as described below, may be used in combination with other alternate embodiments that are described throughout this document.

For example, FIG. 8 shows a general system diagram showing a simplified computing device 10. Such computing devices can be typically be found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, mini-computers, mainframe computers, audio or video media players, etc.

To allow a device to implement embodiments of the elastic scaling cloud-hosted batch application system 100 and method described herein, the device should have a sufficient computational capability and system memory to enable basic computational operations. In particular, as illustrated by FIG. 8, the computational capability is generally illustrated by one or more processing unit(s) 12, and may also include one or more GPUs 14, either or both in communication with system memory 16. Note that the processing unit(s) 12 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 8 may also include other components, such as, for example, a communications interface 18. The simplified computing device of FIG. 8 may also include one or more conventional computer input devices 20 (e.g., pointing devices, keyboards, audio input devices, video input devices, haptic input devices, devices for receiving wired or wireless data transmissions, etc.). The simplified computing device of FIG. 8 may also include other optional components, such as, for example, one or more conventional computer output devices 22 (e.g., display device(s) 24, audio output devices, video output devices, devices for transmitting wired or wireless data transmissions, etc.). Note that typical communications interfaces 18, input devices 20, output devices 22, and storage devices 26 for general-purpose computers are well known to those skilled in the art, and will not be described in detail herein.

The simplified computing device of FIG. 8 may also include a variety of computer readable media. Computer readable media can be any available media that can be accessed by computer 10 via storage devices 26 and includes both volatile and nonvolatile media that is either removable 28 and/or non-removable 30, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Retention of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer to a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the elastic scaling cloud-hosted batch application system 100 and method described herein, or portions thereof, may be stored, received, transmitted, or read from any desired combination of computer or machine readable media or storage devices and communication media in the form of computer executable instructions or other data structures.

Finally, embodiments of the elastic scaling cloud-hosted batch application system 100 and method described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

Moreover, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
accessing a compiler-generated directed acyclic graph of job execution for jobs included in batch applications in a cloud-hosted batch application computing environment;
estimating a number of compute instances required to execute the jobs from metadata produced by the compiler-generating, the metadata including expected job execution times for the jobs;
performing automated elastic scaling of the number of estimated compute instances by:
determining a current estimate of a work volume to be performed based on a current rate of job arrival and the expected job execution times;
dynamically adapting the number of estimated compute instances in the cloud-hosted computing environment based on the current estimate of the work volume to simultaneously minimize a completion time for each job and minimize a monetary cost of actual compute instances used to complete each job.

2. The method of claim 1, wherein performing the automated elastic scaling includes increasing the number of adapted compute instances as a first later estimate of the work volume increases and decreasing the number of adapted compute instances as a second later estimate of the work volume decreases.

3. The method of claim 1, wherein determining the current estimate includes determining the current estimate of the work volume as the cumulative sum of execution times of jobs remaining to be executed.

4. The method of claim 1, wherein performing the automated elastic scaling includes predicting a future work volume by based on a number of jobs in a queue and a current job processing rate.

5. The method of claim 4, wherein performing the automated elastic scaling includes:
determining that the current job processing rate is less than a desired processing rate for the number of jobs in the queue; and
incrementally increasing the number of the adapted compute instances over time, before they are needed to mitigate startup delays of the adapted compute instances, the need to mitigate based on the determining that the current job processing rate is less than the desired processing rate.

6. The method of claim 4, wherein performing the automated elastic scaling includes actively monitoring an arrival of jobs in the queue and an expected execution time of each arrived job to predict the future work volume and to adjust the number of adapted compute instances.

7. The method of claim 1, wherein performing the automated elastic scaling includes determining how many tasks are to be processed per job based on the task execution times across the multiple jobs.

8. The method of claim 1, wherein performing the automated elastic scaling includes:
inputting a single compute instance having a plurality of job queues associated with it;
associating one instance controller to the single compute instance;
prioritizing jobs in the plurality of job queues in order of priority such that those jobs having a higher priority are executed before those jobs having a lower priority; and
executing the jobs in order of priority.

9. The method of claim 8, wherein performing the automated elastic scaling includes:
determining that more than one of the jobs has a same priority; and
using a global controller to ensure fairness among the jobs with the same priority.

10. The method of claim 1, wherein performing the automated elastic scaling includes setting a weight parameter for an application that is using the jobs based on the type of application to balance a tradeoff between minimizing the completion time and the monetary cost of the actual compute instances.

11. The method of claim 1, wherein performing the automated elastic scaling includes adjusting a scale-out/scale-in parameter that allows the adapted number of compute instances used to execute the jobs to be increased and decreased.

12. An elastic scaling cloud-hosted batch application system, comprising:
a queue system containing a plurality of queues such that each of the plurality of queues holds a single job;
at least one computing device that includes one or more processing units in communication with at least one memory, the at least one computing device having logic configured therein to manage an adaptive controller for performing automated auto-scaling of compute instances for executing the jobs obtained from the queue system under dynamic workloads and cloud conditions, the adaptive controller further comprising:
a job controller for each job in a batch application containing a plurality of jobs that estimates a work volume based on a sum of remaining execution times for the plurality of jobs such that each job has one corresponding job controller; and
a global controller in communication with the job controller that:
uses a compiler-generated directed acyclic graph of job execution for the plurality of jobs and estimates a number of compute instances required to execute the jobs from metadata produced by the compiler-generating prior to the jobs being executed; and
uses the estimated work volume to adapt the number of estimated compute instances that execute the plurality of jobs to minimize a completion time for each job while simultaneously minimizing a monetary cost of actual compute instances used to complete the plurality of jobs.

13. The elastic scaling cloud-hosted batch application system of claim 12, further comprising a central metadata service that exchanges metadata with the adapted compute instances and the adaptive controller such that the adaptive controller can make auto-scaling decisions.

14. The elastic scaling cloud-hosted batch application system of claim 13, further comprising an instance controller for each compute instance in the adapted compute instances that allocates execution times among a plurality of queues in the queue system.

15. The elastic scaling cloud-hosted batch application system of claim 12, further comprising a coordinator module that manages a dependency between auto-scaling decisions sent by the global controller and actuations of the auto-scaling decisions by actively monitoring actions of the job controller.

16. The elastic scaling cloud-hosted batch application system of claim 12, further comprising a scale-up/scale-down knob that allows an application to adjust a number of resources allocated to a given compute instance.

17. The elastic scaling cloud-hosted batch application system of claim 12, further comprising a weight parameter that is specific to the batch application that is tuned for the batch application to balance a tradeoff between minimizing the completion time of each job and minimizing the monetary cost of actual compute instances used to execute the plurality of jobs.

18. A method comprising:
accessing a directed acyclic graph of job execution for jobs included in batch applications in a cloud-hosted batch application computing environment, the directed acyclic graph generated by a compiler;
estimating a number of compute instances required to execute the jobs from metadata produced by the generating, wherein the metadata includes expected job execution times for the jobs;
performing automated elastic scaling of the number of estimated compute instances for a batch application containing the jobs, by:
receiving the estimated number of compute instances from job controllers assigned to the jobs, where one job controller is assigned to every job and the estimated number of compute instances is based on the expected job execution times;
aggregating the estimated number of compute instances across each of the job controllers to obtain an aggregated estimated number of compute instances;
dynamically adapting the aggregated number of compute instances to simultaneously minimize a completion time for each job and minimize a monetary cost of actual compute instances used to complete each job.

19. The method of claim 18, wherein performing the automated elastic scaling includes querying a central metadata service at periodic intervals or on-demand to determine a difference between a current allocation of compute instances and a required allocation of compute instances needed to simultaneously minimize a completion time for each job and minimize a monetary cost of actual compute instances used to complete each job.

20. The method of claim 18, wherein
dynamically adapting the aggregated number of compute instances further utilizes a weighted linear combination of the completion time for each job and the monetary cost of actual compute instances used to complete each job.

* * * * *